United States Patent [19]

Mandersson

[11] 4,067,763
[45] Jan. 10, 1978

[54] METHOD FOR THE MANUFACTURE OF LAMINATE WEBS WITH FIRM EDGE STRIP

[75] Inventor: Ragnar Mandersson, Lund, Sweden
[73] Assignee: AB Ziristor, Lund, Sweden
[21] Appl. No.: 749,403
[22] Filed: Dec. 10, 1976

Related U.S. Application Data

[63] Continuation of Ser. No. 601,836, Aug. 4, 1975, abandoned.

[51] Int. Cl.² .............................................. B32B 31/00
[52] U.S. Cl. .................................. 156/264; 156/218; 156/289; 156/306
[58] Field of Search ............... 156/244, 256, 265, 267, 156/268, 269, 270, 510, 522, 218, 259, 263, 264, 289, 290, 306

[56] References Cited

U.S. PATENT DOCUMENTS

| | | | |
|---|---|---|---|
| 3,329,547 | 7/1967 | Denenberg | 156/247 |
| 3,399,096 | 8/1968 | Ranger | 156/244 |
| 3,825,463 | 7/1974 | Amann | 156/268 X |

*Primary Examiner*—William A. Powell
*Attorney, Agent, or Firm*—Earle R. Marden; H. William Petry

[57] ABSTRACT

The present invention relates to a method for the manufacture of laminate webs, each of which comprises a central base layer with layers of coating material applied to both sides, one of which extends beyond one edge of the web and forms a firm strip.

1 Claim, 2 Drawing Figures

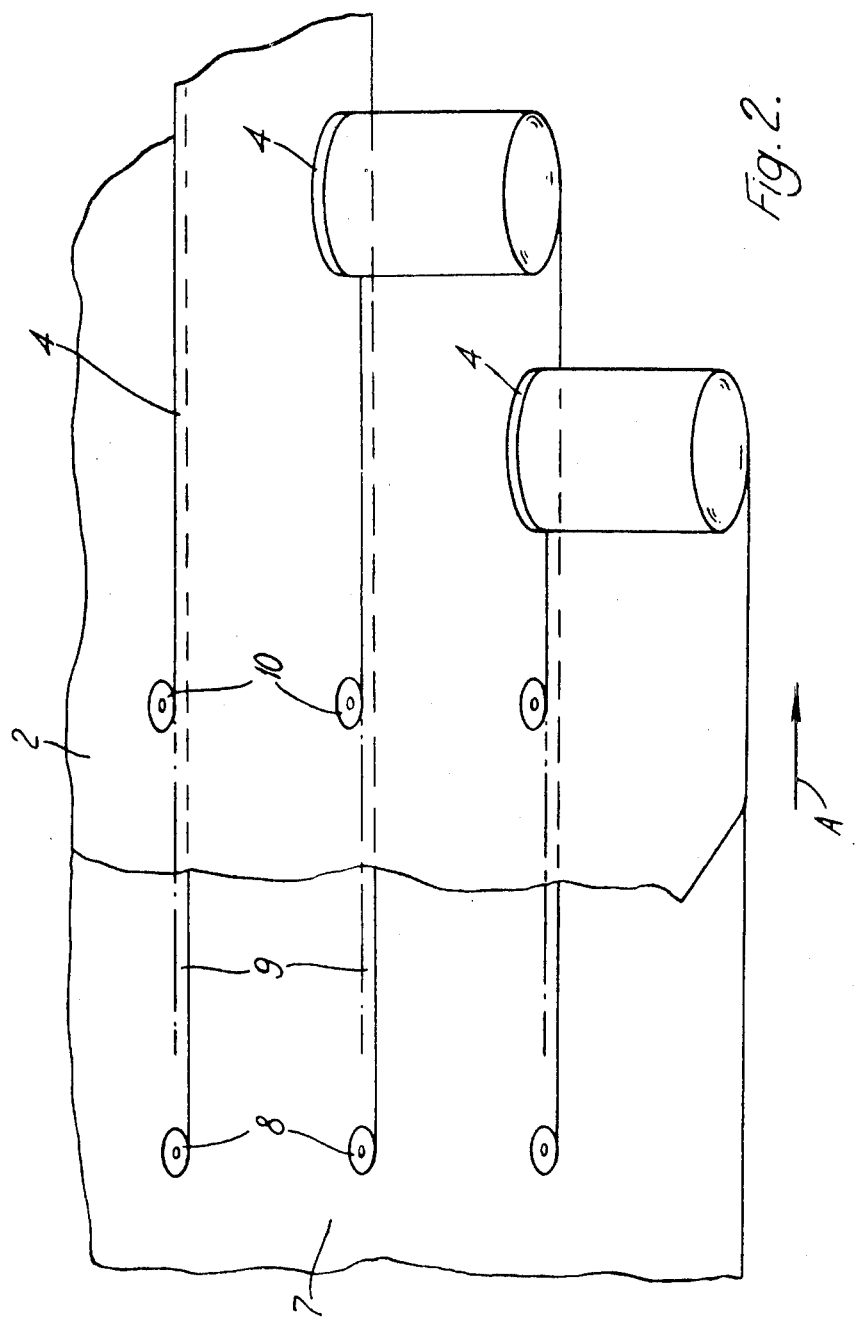

METHOD FOR THE MANUFACTURE OF LAMINATE WEBS WITH FIRM EDGE STRIP

This is a continuation of application Ser. No. 601,836, filed on Aug. 4, 1975, now abandoned.

Several different types of disposable packages for liquid filling materials, e.g. milk, are known. The packages are usually made of a laminated material which comprises a base layer of paper and layers of thermoplastic material applied to the same on either side. A known type of package is manufactured so that a web of laminated material stored in the form of a roll is folded over during its downward movement through a packing machine to tubular shape, whereupon the overlapping edge zones of the web are sealed to one another and the filling material is filled in via a filler pipe extending downwards into the tube. During continued downward movement the tube filled with filling material is transversely sealed with the help of sealing jaws, which with simultaneous supply of heat press together the tube walls so that a joint impervious to liquid is produced between the individual, still connected, packages. After a possible further shaping process the sealed tube is divided up into individual finished packages by cutting through the said transverse sealing zones.

The longitudinal joint formed at the folding over of the material web to a tube has the form of a lap joint which means that one edge of the web is situated inside the tube. Since the porous base layer of the laminate is exposed at the edge, filling material will be sucked up into the base layer, unless measures are taken to prevent this. Until now the problem has been solved by covering up the exposed cut edge with the help of a loose plastic strip, which is applied over the joint on the inside of the tube directly after the formation of the joint. It was found that this loose plastic strip prevents, in a satisfactory manner, the penetration of the liquid contents into the base layer, but the placing of the plastic strip involves an extra, undesirable operational stage in the manufacture of the packages. Moreover it requires a strip placing device and various other elements which increase the risk of breakdowns.

One method for overcoming the problem of the loose strip consists in providing the material web with a so-called firm strip already in connection with the manufacture of the laminated material which is to be used in the packing machine, that is to say, allowing one coating material layer of the laminate to extend beyond the base layer at the one edge of the laminate web. Since the laminate webs, which are manufactured in the laminating machines, are several times wider than the material webs which are to be used in the packing machine, the original webs had to be divided into a number of narrower webs, whose width is adapted to the packing machines in which they are to be used. It is not possible therefore to produce the firm strip before, at the earliest, the division of the original wide laminate web into narrower webs. Until now it has not been possible, however, in an effective and economical manner to provide the separate webs with a firm strip, and the methods known until now comprise either the fitting of a separate strip or the cutting off of parts of the base layer so that unnecessary waste is produced.

It is an object of the present invention to overcome the abovementioned difficulties and to conceive a method for providing a laminate web with firm edge strip, which method is simple and economical and can be carried out at the same time as the division of the original material into narrower webs.

This object has been achieved in that a method of the type described in the introduction has been given the characteristic that a laminated material, comprising the base layer and one layer of coating material, is made to pass through a first set of cutting elements which divide the material into parallel webs, that the parallel webs are jointly covered with the second layer of coating material, each web being provided with an adhesion-free zone situated next to the one web edge, in which zone the layer of coating material is inhibited from becoming attached to the base layer, that the webs are made to pass a second set of cutting elements which cut through the second layer of coating material in the boundary line of each adhesion-free zone facing away from the said web edge.

The preferred embodiments of the method in accordance with the invention were given the characteristic features evident from the subsidiary claims.

In the following the invention will be described with reference to the enclosed schematic drawing.

FIG. 2 shows schematically a view of the laminated material during the execution of the method in accordance with the invention.

Figure 1:
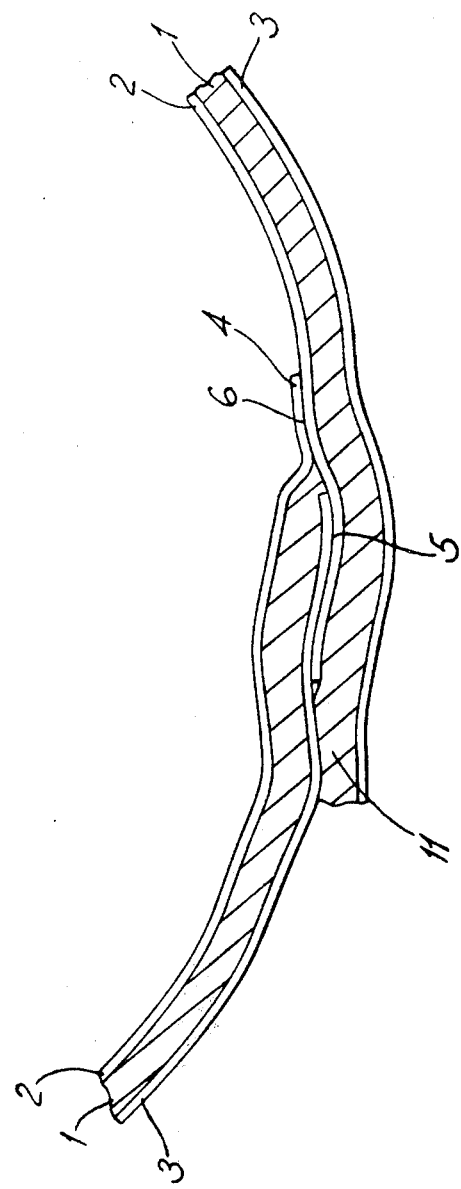
FIG. 1 shows on an enlarged scale a lap joint of the type which is produced on joining together laminate webs manufactured in accordance with the invention.

The overlap joint shown in FIG. 1 is of the same type as the longitudinal joint formed in the process described in the introduction, when, in the manufacture of individual packing containers, the laminated material web is folded over to tubular shape. The upper side of the laminate in FIG. 1 constitutes the inside of the tube. The laminate is conventional and comprises a central base layer 1 and layers of coating material 2, 3 applied to either side of the same. On the material edge situated inside the tube extends a strip 4 of the layer of coating material 2 beyond the edge of the base layer 1. The strip 4 is joined, during the formation of the lap joint, to the layer of coating material 2 in the other edge region of the material web, and thereby prevents any contact of the liquid contents with the base layer 1. The longitudinal joint is produced, in that the edge regions of the material web are placed on top of one another, whereupon the layers of coating material lying against one another in the regions 5, 6 are made to fuse together through pressing and heating, and form a durable seal. To make possible the abovementioned sealing operation, the layers of coating material 2, 3 must comprise a heat-fusible material, e.g. polyethylene or the like, but it is understood that each layer may also include other material layers, e.g. an aluminum foil, which on both sides is surrounded by a heat-fusible material.

FIG. 2 illustrates the method in accordance with the invention, where during the manufacture and division of a laminate web into a number of individual webs, at the same time, the strip of the one layer of coating material extending beyond the base layer of the laminate is produced. For the sake of clarity various details have been left out. Examples of such details are extruding devices, guide rollers, laminating rollers and roller stands which can all be of the conventional type. The material moves during the course of the operation from left to right, that is to say in the direction of the arrow in FIG. 2. On the left in the figure can be seen the undivided, laminated material 7 as delivered from a lamination arrangement. The material 7 in this stage consists only of the base layer 1 and the layer of coating material 3 applied to the underside of the same (FIG. 1). Directly after delivery from the lamination arrangement the laminated material is made to pass a first set of cutting elements 8, which is arranged transversely in relation to the direction of movement of the web. The cutting elements 8 may consist of rotating roller cutters, which, in cooperation with an element located underneath the material web (not shown), completely cut through the material and divide the same into narrower, parallel webs. During the continued feed of the material and execution of the method in accordance with the invention the parallel webs run the whole time alongside one another and in a common plane.

The next stage in the execution of the method in accordance with the invention consists in the production of an adhesion-free zone next to the one web edge on the base layer of each web. The adhesion-free zone 9 is produced, e.g. in that an adhesion-inhibiting substance e.g. wax or silicon compounds, is applied to the base layer in the form of a border of the desired width. The application device for the adhesion-inhibiting substance is of the known type and is not shown on the drawing.

After the application of the adhesion-inhibiting substance, the laminate webs running alongside one another are provided with the common top layer of coating material 2. This is achieved by means of an extruding device arranged transversely above the webs, by means of which a heated mass of plastic material is extruded under pressure through a nozzle to to form a coherent film which, by means of a pair of laminating rollers arranged thereafter, is attached to the base layer 1 and the layer of coating material 3 applied earlier. After this application the previously separate webs are now joined together therefore by means of the common layer of coating material 2.

With continued feeding, the material passes a second set of cutting elements 10, which comprises a number of roller cutters arranged transversely in relation to the direction of movement of the material. In contrast to what was the case in the first set of cutting elements 8, this second set of cutting elements 10 does not cut through the whole thickness of the material, but merely divides the upper layer of material 2 into parallel webs. In relation to the first cutting elements 8 the cutting elements 10 are somewhat displaced in lateral direction, which means that the parallel cuts in the layer of coating material 2 will run at some distance alongside the cuts made earlier in the base layer 1 and the layer of coating material 3. The size of this displacement corresponds, more closely defined, to the width of the adhesion-free zone 9, in which the layer of coating material 2, which has been applied, does not stick to the base layer 1. By virtue of the two cuts and the adhesion-free zone, the material is divided up again into separate webs, each of which is provided with a firm strip 4, that is to say a projecting edge of the top layer of coating material 2. Finally the webs are rolled up, each by itself, by means of rolling-up arrangements not shown on the drawing.

The method in accordance with the invention is shown in FIG. 2 in an especially compressed manner and in the actual plant the distance from the first lamination arrangement to the rolling-up station is of a considerable length, since various arrangements not shown on the drawing will have to be accomodated along the manufacturing train. For reasons of space and accessibility the webs do not always run in a straight line, but are guided in a suitable manner by means of rollers. It is essential, however, that at least during the application of the top layer of coating material 2 they should run in a common plane.

Various modifications of the dimensions are of course possible. Thus e.g. the width of the individual laminate webs may be modified through a lateral displacement of the cutting elements 8. It is also possible at the same time to divide the material into laminate webs of unequal width. A lateral displacement of the cutting elements 8 requires, however, a corresponding lateral displacement of the cutting elements 10. Naturally it is also possible to vary the width of the firm strip by laterally displacing the cutting elements 10 in relation to the cutting elements 8.

The adhesion-free zones of the material can also be achieved in a different manner, known in itself. Instead of applying a border of an adhesion-inhibiting agent to the base layer of the material, it is possible e.g. to provide the lamination roller which completes the application of the top layer 2 with all-round grooves, the width and placing of which correspond to the desired width and placing of the adhesion-free zones. As a result of this the layer of coating material 2 is not pressed against the base layer 1 in these regions, and zones with little or no adhesion between the layer 2 and the base layer 1 are produced.

The base layer may consist of foamed plastic or fibrous material e.g. paper, and the layers of coating material may consist of homogeneous plastic or an aluminum foil surrounded on both sides by homogeneous plastic material.

At the joining together of both edge regions of a laminate web in a lap joint for the formation of the longitudinal joint in a tube, the edge region 11 (FIG. 1) situated on the outside of the tube is not joined at all, or joined only with an easily breakable seal, to the outer layer of coating material 3 at the heat-sealing, since the outer material edge lacks the part of the inner, heat-sealable layer of coating material 2 corresponding to the strip 4. This is an advantage in cases where a tearing thread for the opening of the package extends through the joint, since the loose edge will then serve as a guide for the tearing thread.

By the method in accordance with the invention it is possible therefore, together with the manufacture of the laminated material, to divide the same into narrower, separate webs and provide each of these with a firm strip without any material being wasted.

Although the preferred embodiment has been specifically described, it is contemplated that changes may be made without departing from the scope or spirit of the invention and it is desired that the invention be limited only by the scope of the claims.

That which is claimed is:

1. A method to manufacture a plurality of webs of laminated material each having one longitudinal edge of the outer layer overlapping one longitudinal edge of the other layer and having the other longitudinal edge of the outer layer inward of the other longitudinal edge of the other layer comprising the steps of: supplying a first web of material, cutting said first web of material into a plurality of webs of material, laminating a second layer of material onto the plurality of webs of material and leaving a portion of the second layer adjacent the same edge of each of said plurality of webs of material unlaminated to the web material and cutting longitudinally through the second layer inward of the edge of each of the web materials only through the unlaminated portions thereof to separate the plurality of webs of material once again to provide webs of laminated material each having one longitudinal edge of the second material projecting beyond one longitudinal edge of the first material and having the other longitudinal edge of the second material inward of the other longitudinal edge of the first material.

* * * * *